United States Patent
Nugrahani et al.

(10) Patent No.: US 10,697,657 B2
(45) Date of Patent: Jun. 30, 2020

(54) VENTILATION METHOD, CONTROL DEVICE, AND VENTILATION SYSTEM

(71) Applicant: Panasonic Intellectual Property Management Co., Ltd., Osaka (JP)

(72) Inventors: Sista Nugrahani, Tokyo (JP); Katsunori Daimou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 123 days.

(21) Appl. No.: 15/973,634

(22) Filed: May 8, 2018

(65) Prior Publication Data

US 2018/0347837 A1    Dec. 6, 2018

(30) Foreign Application Priority Data

May 30, 2017  (JP) ................................. 2017-106997

(51) Int. Cl.
  *F24F 11/00*   (2018.01)
  *F24F 11/77*   (2018.01)
  *G05B 13/02*   (2006.01)
  *F24F 110/12*  (2018.01)

(52) U.S. Cl.
  CPC .......... *F24F 11/0001* (2013.01); *F24F 11/77* (2018.01); *G05B 13/024* (2013.01); *F24F 2011/0002* (2013.01); *F24F 2110/12* (2018.01)

(58) Field of Classification Search
  CPC ...... F24F 11/0001; F24F 11/77; G05B 13/024
  See application file for complete search history.

(56) References Cited

U.S. PATENT DOCUMENTS

| | | | | |
|---|---|---|---|---|
| 5,971,067 A * | 10/1999 | Rayburn | .................. | F24F 11/30 165/217 |
| 6,634,422 B2 * | 10/2003 | Rayburn | .................. | F24F 11/76 165/250 |
| 2001/0010266 A1 * | 8/2001 | Rayburn | ................ | F24F 3/044 165/257 |
| 2002/0008149 A1 * | 1/2002 | Riley | ...................... | F24F 11/30 236/49.3 |
| 2010/0009619 A1 * | 1/2010 | Christensen | .............. | E06B 7/10 454/196 |
| 2011/0160913 A1 * | 6/2011 | Parker | ................. | F24D 19/1048 700/276 |
| 2014/0206278 A1 * | 7/2014 | Stevenson | ................ | F24F 11/76 454/343 |
| 2016/0001212 A1 * | 1/2016 | Miller | ................ | B01D 46/0043 96/399 |
| 2016/0116177 A1 * | 4/2016 | Sikora | ...................... | F24F 11/30 165/11.2 |
| 2017/0241688 A1 * | 8/2017 | Takeichi | ................. | F25B 13/00 |
| 2018/0299157 A1 * | 10/2018 | Jang | ......................... | F24F 1/00 |

FOREIGN PATENT DOCUMENTS

JP    2007-003160    1/2007

* cited by examiner

*Primary Examiner* — Vincent H Tran
(74) *Attorney, Agent, or Firm* — Greenblum & Bernstein, P.L.C.

(57) ABSTRACT

A ventilation method includes: acquiring an outdoor temperature; and increasing an amount of ventilation of a ventilation unit including one or more ventilators that ventilate a shopping space of a shop in which a cooling apparatus for storage of a product is provided when the outdoor temperature is equal to or lower than a threshold temperature.

9 Claims, 8 Drawing Sheets

VENTILATION METHOD, CONTROL DEVICE, AND VENTILATION SYSTEM

BACKGROUND

1. Technical Field

The present disclosure relates to a ventilation method and the like for ventilation.

2. Description of the Related Art

Japanese Unexamined Patent Application Publication No. 2007-3160 discloses a ventilation system for controlling an operation state of a ventilation unit on the basis of a carbon dioxide concentration inside a shop.

SUMMARY

However, a cooling apparatus for storage of a product is provided in some shops, and such a cooling apparatus generally consumes large electric power.

One non-limiting and exemplary embodiment provides a ventilation method and the like that can properly reduce electric power consumption of a shop in which a cooling apparatus for storage of a product is provided.

In one general aspect, the techniques disclosed here feature a ventilation method includes: acquiring an outdoor temperature; and increasing an amount of ventilation of a ventilation unit including one or more ventilators that ventilate a shopping space of a shop in which a cooling apparatus for storage of a product is provided when the outdoor temperature is equal to or lower than a threshold temperature.

According to a ventilation method and the like according to an aspect of the present disclosure, it is possible to properly reduce electric power consumption of a shop in which a cooling apparatus for storage of a product is provided.

It should be noted that general or specific embodiments may be implemented as a system, a device, a method, an integrated circuit, a computer program, a non-transitory computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Underlying knowledge of the inventors forming the basis of the present disclosure concerning a ventilation method and the like for ventilation is described.

A cooling apparatus for storage of a product is provided at some shops such as supermarkets or convenience stores. The cooling apparatus is an apparatus for freezing or cooling a stored product and is, for example, a showcase for freezing or cooling, a freezer, or a refrigerator. Such a cooling apparatus generally consumes large electric power.

Electric power consumption of a cooling apparatus also depends on an environment surrounding the cooling apparatus. For example, it is assumed that electric power consumed to keep a temperature in a storage space in which a product is stored in the cooling apparatus becomes larger as a difference between a temperature around the cooling apparatus and a temperature in the storage space becomes larger.

For example, 24-hour ventilation is required at shops by law from a hygiene point of view. In winter, cool air flows into a shop by ventilation. This may lower a temperature around a cooling apparatus provided at the shop. That is, there is a possibility that ventilation reduce a difference between the temperature around the cooling apparatus and the temperature in the storage space of the cooling apparatus, thereby reducing electric power consumption of the cooling apparatus.

However, there is a possibility that increasing an amount of ventilation increase electric power consumption for ventilation, thereby increasing electric power consumption of the whole shop.

In view of this, a ventilation method according to an aspect of the present disclosure includes increasing an amount of ventilation of a ventilation unit including one or more ventilators that ventilate a shopping space of a shop in which a cooling apparatus for storage of a product is provided when an outdoor temperature is equal to or lower than a threshold temperature.

According to this arrangement, an amount of ventilation is increased in a state where the outdoor temperature is equal to or lower than the threshold temperature. Accordingly, outdoor air having a temperature equal to or lower than the threshold temperature is efficiently taken into the shopping space of the shop. It is therefore possible to reduce electric power consumption of the cooling apparatus. Furthermore, an increase in electric power consumption for ventilation can be kept small because of efficient ventilation. That is, according to the above ventilation method, it is possible to properly reduce electric power consumption of the shop in which the cooling apparatus for storage of a product is provided.

For example, the ventilation method may be arranged such that the amount of ventilation of the ventilation unit is increased when the outdoor temperature is equal to or lower than the threshold temperature during a period starting from closing of the shop.

According to this arrangement, it is possible to suppress problems such as increasing electric power consumption for air conditioning because of a low in-store temperature during opening of the shop.

For example, the ventilation method may be arranged such that the amount of ventilation of the ventilation unit is not increased before the shop opens even when the outdoor temperature is equal to or lower than the threshold temperature.

According to this arrangement, it is possible to suppress problems such as increasing electric power consumption for air conditioning in order to increase an in-shop temperature when the shop opens because the in-store temperature is low before opening of the shop.

For example, the ventilation method may be arranged such that when the shop is a plurality of shops, the threshold temperature set for at least one of the plurality of shops is different from the threshold temperature set for other shops of the plurality of shops.

According to this arrangement, it is possible to control an increase in amount of ventilation in accordance with a proper threshold temperature defined for each shop.

A control device according to as aspect of the present disclosure may be a control device that includes an acquirer that acquires an outdoor temperature; and a controller that increases an amount of ventilation of a ventilation unit including one or more ventilators that ventilate a shopping space of a shop in which a cooling apparatus for storage of a product is provided when the outdoor temperature acquired by the acquirer is equal to or lower than a threshold temperature.

According to this arrangement, the control device can increase an amount of ventilation in a state where the outdoor temperature is equal to or lower than the threshold temperature. Accordingly, the control device can efficiently take outdoor air having a temperature equal to or lower than the threshold temperature into the shopping space of the shop. Consequently, the control device can reduce electric power consumption of the cooling apparatus. Furthermore, the control device can keep an increase in electric power consumption for ventilation small because of efficient ventilation. That is, the control device can properly reduce electric power consumption of the shop in which the cooling apparatus for storage of a product is provided.

A ventilation system according to an aspect of the present disclosure may be a ventilation system including a ventilation unit including one or more ventilators that ventilate a shopping space of a shop in which a cooling apparatus for storage of a product is provided; an acquirer that acquires an outdoor temperature; and a controller that increases an amount of ventilation of the ventilation unit when the outdoor temperature acquired by the acquirer is equal to or lower than a threshold temperature.

According to this arrangement, the ventilation system can increase an amount of ventilation in a state where the outdoor temperature is equal to or lower than the threshold temperature. Accordingly, the ventilation system can efficiently take outdoor air having a temperature equal to or lower than the threshold temperature into the shopping space of the shop. Consequently, the ventilation system can reduce electric power consumption of the cooling apparatus. Furthermore, the ventilation system can keep an increase in electric power consumption for ventilation small because of efficient ventilation. That is, the ventilation system can properly reduce electric power consumption of the shop in which the cooling apparatus for storage of a product is provided.

It should be noted that general or specific embodiments may be implemented as a system, a device, a method, an integrated circuit, a computer program, a non-transitory computer-readable storage medium such as a CD-ROM, or any selective combination thereof.

An embodiment is specifically described with reference to the drawings. The embodiment described below is a general or specific example. Numerical values, shapes, materials, constituent elements, the way in which the constituent elements are disposed and connected, steps, the order of steps, and the like are examples and do not limit the present disclosure. Among constituent elements in the embodiment below, constituent elements that are not described in independent claims indicating highest concepts are described as optional constituent elements.

The term "electric power consumption" refers to an amount of consumed electric power and may be expressed by W (watt) or may be expressed by Wh (watt-hour).

Embodiment

Figure 1:
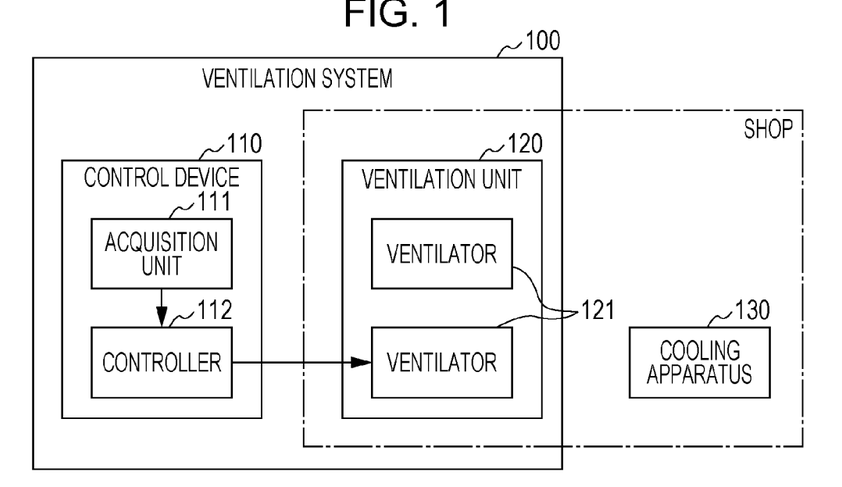
FIG. 1 is a block diagram illustrating a configuration of a ventilation system according to an embodiment.

FIG. 1 is a block diagram illustrating a configuration of a ventilation system according to the present embodiment. The ventilation system 100 illustrated in FIG. 1 is an example of a ventilation system according to the present disclosure and ventilates a shopping space of a shop. In the present embodiment, the ventilation system 100 includes a control device 110 and a ventilation unit 120.

The control device 110 is an example of a control device according to the present disclosure and performs a control operation for ventilation of a shopping space of a shop. The control device 110 may include an arithmetic processor, a storage unit, and the like for ventilation control. The arithmetic processor may be an MPU or a CPU. The storage unit may be a volatile memory or a non-volatile memory. A program for ventilation control may be stored in the storage unit. In the present embodiment, the control device 110 includes an acquisition unit 111 and a controller 112.

The acquisition unit 111 is an example of an acquirer according to the present disclosure and acquires information for ventilation of the shopping space of the shop. The acquisition unit 111 may be a general-purpose or a dedicated-purpose electric circuit. In the present embodiment, the acquisition unit 111 acquires an outdoor temperature. The acquisition unit 111 may acquire other parameters for ventilation of the shopping space of the shop. The outdoor temperature acquired by the acquisition unit 111 may be an outdoor temperature itself or may be a parameter that is correlated with the outdoor temperature. For example, the outdoor temperature itself may be an outdoor temperature detected by a temperature detector or may be an outdoor temperature predicted by weather forecast. For example, the parameter that is correlated with the outdoor temperature may be a temperature inside the shop.

The acquisition unit 111 may include, for example, a terminal or an antenna for receiving information through wired or wireless communication. The acquisition unit 111 may acquire information by receiving the information through wired or wireless communication. For example, the acquisition unit 111 may acquire an outdoor temperature by receiving an outdoor temperature detected by a temperature sensor from the temperature sensor. The acquisition unit 111 may acquire various kinds of parameters by receiving the various kinds of parameters, for example, from another device.

The acquisition unit 111 may include a sensor. The acquisition unit 111 may acquire information by detecting the information by using the sensor. Specifically, the acquisition unit 111 may include a temperature sensor that detects an outdoor temperature. The acquisition unit 111 may acquire an outdoor temperature by detecting the outdoor temperature by using the temperature sensor.

The acquisition unit 111 may include an input interface such as a mouse, a keyboard, or a touch panel. The acquisition unit 111 may acquire information through the input interface. For example, the acquisition unit 111 may acquire various kinds of parameters for ventilation of the shopping space of the shop through the input interface.

Furthermore, the acquisition unit 111 may include a connection interface for connection with a memory such as a recording medium. The acquisition unit 111 may acquire information from the memory. The acquisition unit 111 may process acquired information and acquire a result of the information processing as new information.

The acquisition unit 111 may be constituted by a plurality of acquisition units that acquire plural kinds of information. For example, the acquisition unit 111 may include an outdoor temperature acquisition unit that acquires an outdoor temperature, an in-store temperature acquisition unit that acquires an in-store temperature, a parameter acquisition unit that acquires other parameters for ventilation of the shopping space of the shop, and the like.

The controller 112 is an example of a controller according to the present disclosure and performs a control operation for ventilation of the shopping space of the shop. The controller 112 may be a general-purpose or a dedicated-purpose electric circuit and include an arithmetic processor, a storage unit, and the like for ventilation control. The arithmetic processor may be an MPU or a CPU. The storage unit may be a volatile memory or a non-volatile memory. A program for ventilation control may be stored in the storage unit.

Specifically, the controller 112 may perform a control operation for ventilation of the shopping space of the shop, for example, in accordance with an outdoor temperature acquired by the acquisition unit 111. For example, the controller 112 controls an amount of ventilation of the ventilation unit 120.

More specifically, the controller 112 may control an amount of ventilation of the ventilation unit 120 by controlling an amount of ventilation of each of one or more ventilators 121 included in the ventilation unit 120. Alternatively, the controller 112 may control an amount of ventilation of the ventilation unit 120 by controlling the number of ventilators 121 that are turned on, i.e., put into operation among the one or more ventilators 121 of the ventilation unit 120.

The controller 112 may include a terminal or an antenna for transmitting a command through wired or wireless communication. The controller 112 may control an amount of ventilation of the ventilation unit 120 by transmitting a command to the ventilation unit 120 or each of the ventilators 121. The terminal used for transmission of a command by the controller 112 may be the same as the terminal used for reception of information by the acquisition unit 111, and the antenna used for transmission of a command by the controller 112 may be the same as the antenna used for reception of information by the acquisition unit 111.

The controller 112 increases an amount of ventilation of the ventilation unit 120 when an outdoor temperature is equal to or lower than a threshold temperature. The controller 112 makes an amount of ventilation of the ventilation unit 120 equal to a usual amount of ventilation when the outdoor temperature is higher than the threshold temperature.

That is, the controller 112 increases an amount of ventilation of the ventilation unit 120 to an amount larger than the usual amount of ventilation when the outdoor temperature is equal to or lower than the threshold temperature. In other words, the controller 112 increases an amount of ventilation of the ventilation unit 120 in a state where the outdoor temperature is equal to or lower than a threshold temperature to an amount larger than an amount of ventilation of the ventilation unit 120 in a state where the outdoor temperature is higher than the threshold temperature. The increase of the amount of ventilation can be realized by causing the controller 112 to perform at least one of a first control operation for increasing an amount of ventilation output by the ventilators 121 and a second control operation for increasing the number of ventilators 121 that are put into operation.

As a result, outdoor air having a temperature equal to or lower than the threshold temperature is efficiently taken into the shopping space of the shop. Note that the usual amount of ventilation may be zero. That is, the usual amount of ventilation may correspond to a state where ventilation is not performed. Alternatively, the usual amount of ventilation may be a relatively small amount of ventilation for 24-hour ventilation.

The controller 112 may performs a control operation for increasing an amount of ventilation of the ventilation unit 120 to an amount larger than the usual amount of ventilation when the outdoor temperature is equal to or lower than the threshold temperature during a control period. For example, the control period starts when the sop closes and ends before the shop opens.

That is, the controller 112 may increase an amount of ventilation of the ventilation unit 120 to an amount larger than the usual amount of ventilation when the outdoor temperature is equal to or lower than the threshold temperature after the shop closes. Furthermore, the controller 112 may be configured not to increase an amount of ventilation of the ventilation unit 120 to an amount larger than the usual amount of ventilation even when the outdoor temperature is equal to or lower than the threshold temperature before the shop opens. This makes it possible to suppress a problem that an in-store temperature becomes low while the shop is open or when the shop opens.

The ventilation unit 120 is an example of a ventilation unit according to the present disclosure and ventilates the shopping space of the shop. The ventilation unit 120 includes one or more ventilators 121. In the example of FIG. 1, the ventilation unit 120 includes two ventilators 121, but the ventilation unit 120 may include a single ventilator 121 or may include three or more ventilators 121.

The ventilators 121 are an example of a ventilator according to the present disclosure and ventilate the shopping space of the shop. In the present embodiment, the ventilators 121 are provided at the shop. More specifically, the ventilators 121 are provided in the shopping space of the shop. The ventilators 121 may be intake ventilators, may be exhaust ventilators, or may be a combination of an intake ventilator and an exhaust ventilator. The ventilation unit 120 may include an intake ventilator and an exhaust ventilator as the ventilators 121.

For example, each of the ventilators 121 includes a fan called a ventilation fan, an intake fan, an exhaust fan, or the like and performs ventilation by using the fan. The ventilators 121 may ventilate the shopping space of the shop by taking air outside the shop into the shopping space of the shop or may ventilate the shopping space of the shop by releasing air in the shopping space of the shop out of the shop. The ventilators 121 may ventilate the shopping space of the shop by taking air outside the shop into the shopping space of the shop and releasing air in the shopping space of the shop out of the shop.

The cooling apparatus 130 is an example of a cooling apparatus according to the present disclosure and is a cooling apparatus for storage of a product. Specifically, the cooling apparatus 130 is an apparatus for freezing or cooling a product and is, for example, a showcase for freezing or cooling, a freezer, or a refrigerator. The cooling apparatus 130 has a storage space in which a product is stored. In the present embodiment, the cooling apparatus 130 is provided at the shop. More specifically, the cooling apparatus 130 is provided in the shopping space of the shop.

In the example of FIG. 1, a single cooling apparatus 130 is provided at the shop, but two or more cooling apparatuses 130 may be provided at the shop. The cooling apparatus 130 may be constituted by a plurality of devices. For example, the cooling apparatus 130 may be constituted by one or more showcases.

The shop according to the present embodiment is a shop where the cooling apparatus 130 for storage of a product is provided and is a supermarket, a convenience store, or the like. Specifically, the cooling apparatus 130 is provided in the shopping space of the shop. Furthermore, the one or more ventilators 121 that constitute the ventilation unit 120 are provided at the shop. More specifically, the one or more ventilators 121 are provided in the shopping space of the shop.

The acquisition unit 111 and the controller 112 need not constitute the control device 110. That is, the ventilation system 100 may include the acquisition unit 111 and the controller 112 instead of the control device 110. Furthermore, for example, the acquisition unit 111 may be provided at the shop, the controller 112 may be provided at the shop, or the control device 110 may be provided at the shop.

Figure 2:
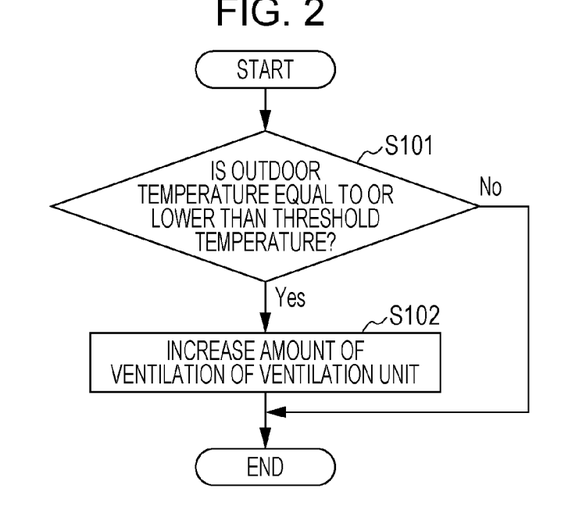
FIG. 2 is a flowchart illustrating an operation of a ventilation system according to the embodiment.

FIG. 2 is a flowchart illustrating an operation of the ventilation system 100 illustrated in FIG. 1. Specifically, when the outdoor temperature is equal to or lower than the threshold temperature (Yes in S101), the ventilation system 100 increases an amount of ventilation of the ventilation unit 120 including the one or more ventilators 121 for ventilating the shopping space of the shop where the cooling apparatus 130 for storage of a product is provided (S102).

For example, the acquisition unit 111 of the ventilation system 100 acquires an outdoor temperature. When the acquired outdoor temperature is equal to or lower than the threshold temperature, the controller 112 of the ventilation system 100 increases an amount of ventilation of the ventilation unit 120. Meanwhile, when the acquired outdoor temperature is higher than the threshold temperature, the controller 112 of the ventilation system 100 does not increase the amount of ventilation of the ventilation unit 120.

That is, the controller 112 increases the amount of ventilation of the ventilation unit 120 to an amount larger than a usual amount of ventilation in a state where the acquired outdoor temperature is equal to or lower than the threshold temperature and makes the amount of ventilation of the ventilation unit 120 equal to the usual amount of ventilation in a state where the acquired outdoor temperature is higher than the threshold temperature.

The ventilation system 100 can thus increase the amount of ventilation in a state where the outdoor temperature is equal to or lower than the threshold temperature. Accordingly, the ventilation system 100 can efficiently take outdoor air having a temperature equal to or lower than the threshold temperature into the shopping space of the shop. As a result, the ventilation system 100 can efficiently lower the in-store temperature.

Consequently, the ventilation system 100 can reduce electric power consumption of the cooling apparatus 130 and keep an increase in electric power consumption for ventilation small. That is, the ventilation system 100 can properly reduce electric power consumption of the shop where the cooling apparatus 130 for storage of a product is provided.

Figure 3:
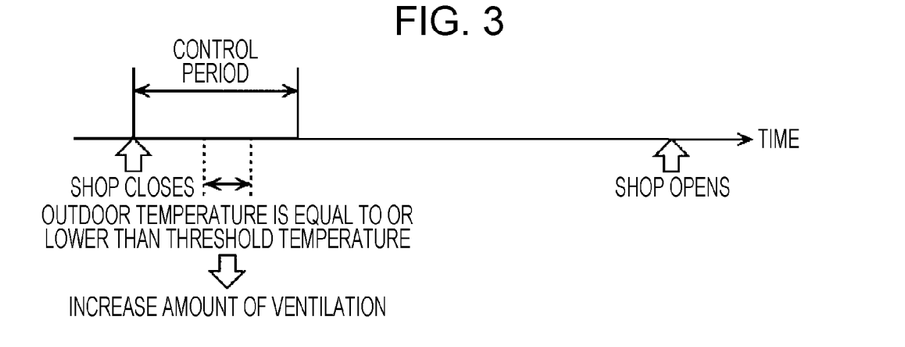
FIG. 3 is a conceptual view illustrating a control period according to the embodiment.

FIG. 3 is a conceptual view illustrating a control period in which the ventilation system 100 illustrated in FIG. 1 controls an increase in amount of ventilation. Control of an increase in amount of ventilation means control for increasing an amount of ventilation of the ventilation unit 120 when an outdoor temperature is equal to or lower than the threshold temperature. The ventilation system 100 may control an increase in amount of ventilation of the ventilation unit 120 during the control period. The ventilation system 100 may make the amount of ventilation of the ventilation unit 120 equal to the usual amount of ventilation without controlling an increase in amount of ventilation of the ventilation unit 120 during a period other than the control period.

That is, for example, when the outdoor temperature is equal to or lower than the threshold temperature during the control period, the ventilation system 100 increases the amount of ventilation of the ventilation unit 120. When the outdoor temperature is higher than the threshold temperature during the control period, the ventilation system 100 makes the amount of ventilation of the ventilation unit 120 equal to the usual amount of ventilation. Furthermore, the ventilation system 100 makes the amount of ventilation of the ventilation unit 120 equal to the usual amount of ventilation during a period other than the control period.

For example, the control period starts when the shop closes and ends before the shop opens. The control period may start when the shop closes and end 1 hour before the shop opens or earlier or end 2 hours before the shop opens or earlier. Specifically, the control period may be a period that starts when the shop closes and that is defined by a period shorter than a period from closing to opening of the shop. The control period may be 30 minutes from closing of the shop, may be 1 hour from closing of the shop, or may be 2 hours from closing of the shop as long as the control period is shorter than the period from closing to opening of the shop.

The ventilation system 100 can lower the in-store temperature earlier by introducing outside air having a temperature equal to or lower than the threshold temperature earlier after closing of the shop. Accordingly, the ventilation system 100 can lower electric power consumption of the cooling apparatus 130 earlier. As a result, the ventilation system 100 can more efficiently reduce electric power consumption of the shop.

Figure 4:
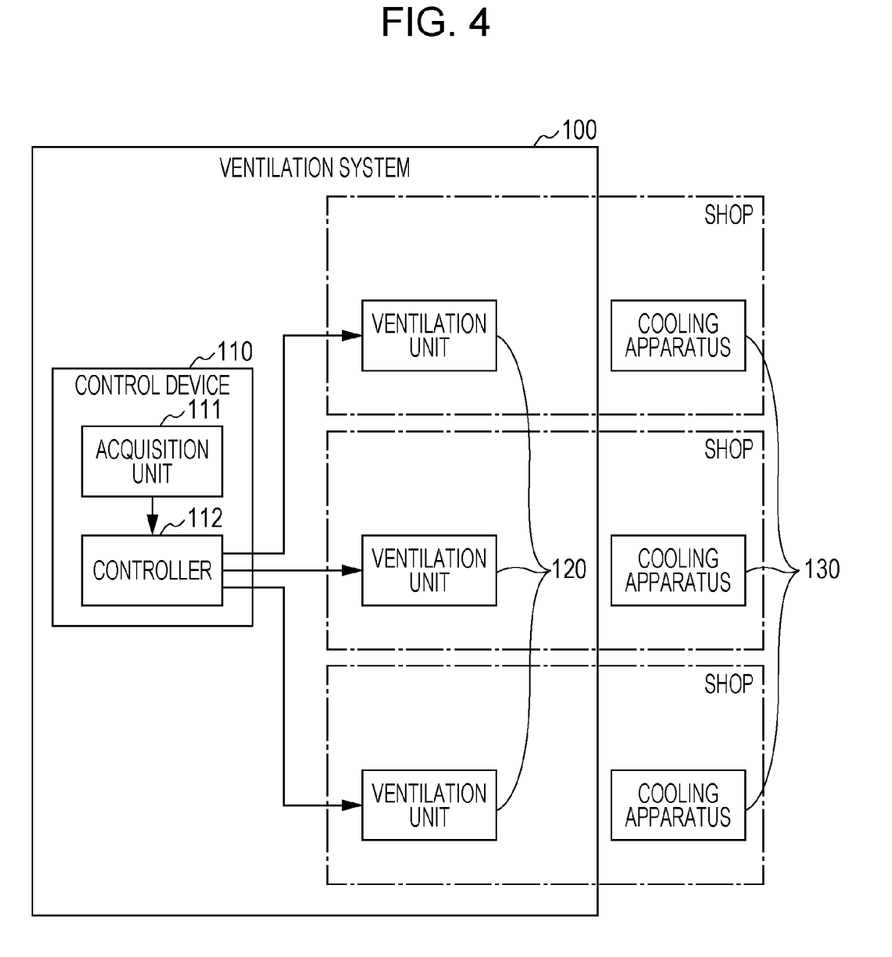
FIG. 4 is a block diagram illustrating a modified configuration of the ventilation system according to the embodiment.

FIG. 4 is a block diagram illustrating a modified configuration of the ventilation system 100 illustrated in FIG. 1. The ventilation system 100 may ventilate a shopping space of each of a plurality of shops. The controller 112 of the ventilation system 100 controls an amount of ventilation of the ventilation unit 120 provided at each of the shops. In the example illustrated in FIG. 4, three shops are illustrated. However, the number of shops in which an amount of ventilation is controlled by the ventilation system 100 may be less than three or may be more than three.

The acquisition unit 111 may acquire an outdoor temperature common to the plurality of shops or may acquire an individual outdoor temperature for each of the plurality of shops. The individual outdoor temperature may be an outdoor temperature obtained from a temperature sensor provided around the shop or may be an outdoor temperature estimated from a location of the shop. The acquisition unit 111 may acquire an outdoor temperature estimated from a location of the shop from an external device.

The controller 112 controls an amount of ventilation of each of the ventilation units 120 by comparing an outdoor temperature and a threshold temperature. The threshold temperature may be set for each of the shops. That is, a threshold temperature set for at least one of the plurality of shops may be different from a threshold temperature set for the other shops. This allows the ventilation system 100 to perform a control operation for increasing an amount of ventilation by using a threshold temperature appropriate for each of the shops.

Similarly, the control period may be set for each of the shops. That is, a control period set for at least one of the plurality of shops may be different from a control period set for the other shops. Similarly, a usual amount of ventilation or an increased amount of ventilation may be set for each of the shops. That is, an amount of ventilation set for at least one of the plurality of shops may be different from an amount of ventilation set for the other shops.

In the example illustrated in FIG. 4, the control device 110, the acquisition unit 111, and the controller 112 that are common to the plurality of shops are provided. However, the acquisition unit 111, the controller 112, and the control device 110 may be individually provided for each of the plurality of shops.

In the present embodiment, the acquisition unit 111 may acquire an in-store temperature. When an outdoor temperature is equal to or lower than the threshold temperature and where the outdoor temperature is lower than the in-store temperature, the controller 112 may increase an amount of ventilation. Alternatively, the acquisition unit 111 or the controller 112 may adjust the threshold temperature to a temperature lower than the in-store temperature. In this case, the controller 112 may increase an amount of ventilation when the outdoor temperature is equal to or lower than the threshold temperature adjusted to the temperature lower than the in-store temperature.

Specific Example

Figure 5:
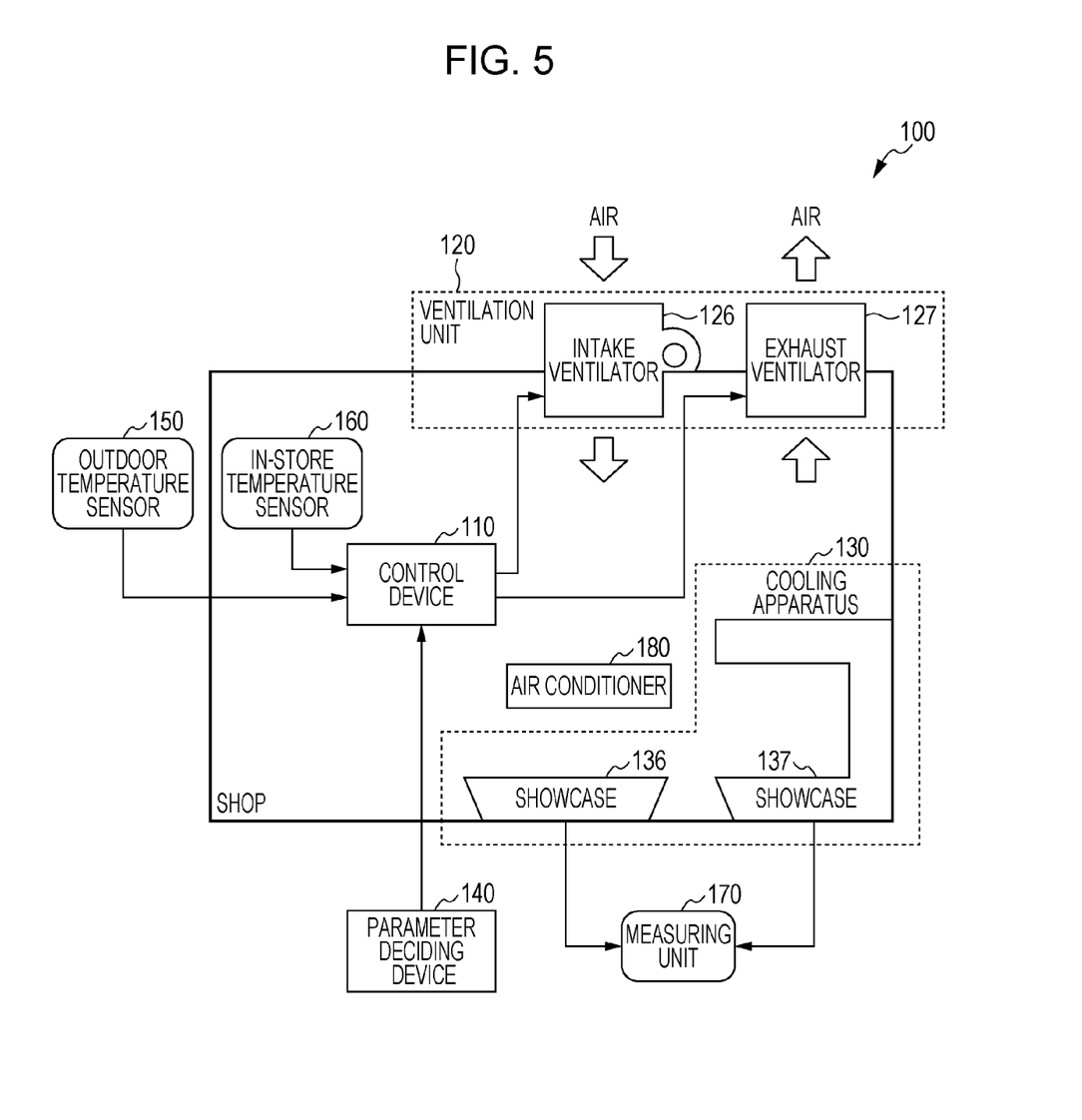
FIG. 5 is a block diagram illustrating a configuration of the ventilation system in a specific example.

FIG. 5 is a block diagram illustrating a configuration of the ventilation system 100 according to this specific example. In this specific example, the ventilation system 100 includes the control device 110, an intake ventilator 126, an exhaust ventilator 127, and the like.

The intake ventilator 126 takes air from an outside of the shop into an inside of the shop. The inside of the shop corresponds to the shopping space of the shop. Specifically, the intake ventilator 126 takes air into the shopping space of the shop.

The exhaust ventilator 127 releases air from the inside of the shop into the outside of the shop. Specifically, the exhaust ventilator 127 releases air from the shopping space of the shop.

For example, the intake ventilator 126 and the exhaust ventilator 127 constitute the ventilation unit 120. That is, each of the intake ventilator 126 and the exhaust ventilator 127 is an example of the ventilator 121. The ventilation system 100 may include one or more intake ventilators (not illustrated) and one or more exhaust ventilators (not illustrated) as the plurality of ventilators 121 that constitute the ventilation unit 120 in addition to the intake ventilator 126 and the exhaust ventilator 127.

The ventilation unit 120 and the ventilators 121 provided at the shop are basically provided so as to straddle the inside of the shop and the outside of the shop.

An outdoor temperature sensor 150 is a sensor that detects a temperature and is provided outside the shop. Specifically, the outdoor temperature sensor 150 detects an outdoor temperature. The outdoor temperature detected by the outdoor temperature sensor 150 is used for control of the ventilation unit 120 by the control device 110. The outdoor temperature detected by the outdoor temperature sensor 150 may be used for decision of a parameter by a parameter deciding device 140.

An in-store temperature sensor 160 is a sensor that detects a temperature and is provided in the inside of the shop. Specifically, the in-store temperature sensor 160 detects an in-store temperature. The in-store temperature detected by the in-store temperature sensor 160 may be used for control of the ventilation unit 120 by the control device 110. The in-store temperature detected by the in-store temperature sensor 160 may be used for decision of a parameter by the parameter deciding device 140.

In a system environment in which the in-store temperature detected by the in-store temperature sensor 160 is not used for control of the ventilation unit 120, decision of a parameter, or the like, the in-store temperature need not be detected or the in-store temperature sensor 160 need not be provided.

Showcases 136 and 137 are showcases for freezing or cooling and for storage of a product. That is, the showcases 136 and 137 are examples of the cooling apparatus 130. The showcase 136 may be a showcase for freezing, and the showcase 137 may be a showcase for cooling.

Each of the showcases 136 and 137 may be a freezer-independent-type showcase or may be a freezer-built-in-type showcase. The freezer-independent-type showcase includes, for example, a freezer provided outside the shop and a showcase provided inside the shop. The freezer provided outside the shop is called an outdoor unit. The freezer-built-in-type showcase includes, for example, a freezer inside a showcase provided at the shop.

For example, the showcase 136 may be a freezer-built-in-type showcase, and the showcase 137 may be a freezer-independent-type showcase. The whole cooling apparatus 130 provided at the shop or in the shopping space of the shop need not be provided at the shop or in the shopping space of the shop, and instead part of the cooling apparatus 130 may be provided outside the shop, for example, as an outdoor unit. That is, the cooling apparatus 130 may be entirely provided at the shop or in the shopping space of the shop or may be partially provided at the shop or in the shopping space of the shop.

A measuring unit 170 is a measuring unit that measures electric power consumption. Specifically, the measuring unit 170 measures electric power consumption of the showcases 136 and 137. The measuring unit 170 may measure electric power consumption of a freezer-independent-type showcase including electric power consumption of a freezer provided outside the shop. The electric power consumption measured by the measuring unit 170 may be used for decision of a parameter by the parameter deciding device 140.

In a system environment in which the electric power consumption measured by the measuring unit 170 is not used for decision of a parameter or the like, the electric power consumption need not be measured or the measuring unit 170 need not be provided.

The measuring unit 170 may separately measure electric power consumption of the showcase 136 and electric power consumption of the showcase 137. Furthermore, the measuring unit 170 may measure electric power consumption of the intake ventilator 126 and electric power consumption of the exhaust ventilator 127 separately from the electric power consumption of the showcase 136 and the electric power consumption of the showcase 137. The electric power consumption thus measured by the measuring unit 170 may be used for decision of a parameter by the parameter deciding device 140. The measuring unit 170 may measure electric power consumption of the whole shop including the control device 110 and the like.

An air conditioner 180 is a device that adjusts a temperature of air. Specifically, the air conditioner 180 adjusts an in-store temperature to a set temperature. The air conditioner 180 is not in operation while the shop is closed and is in operation while the shop is opened. That is, the air conditioner 180 adjusts an in-store temperature to a set temperature while the shop is opened.

The parameter deciding device 140 decides a parameter for control of an increase in amount of ventilation. The parameter deciding device 140 may include an arithmetic processor, a storage unit, and the like for decision of a parameter. The arithmetic processor may be an MPU or a CPU. The storage unit may be a volatile memory or a non-volatile memory. A program for decision of a parameter may be stored in the storage unit. A specific configuration of the parameter deciding device 140 is described next. The control device 110 may include the parameter deciding device 140 and function as the parameter deciding device 140.

Figure 6:
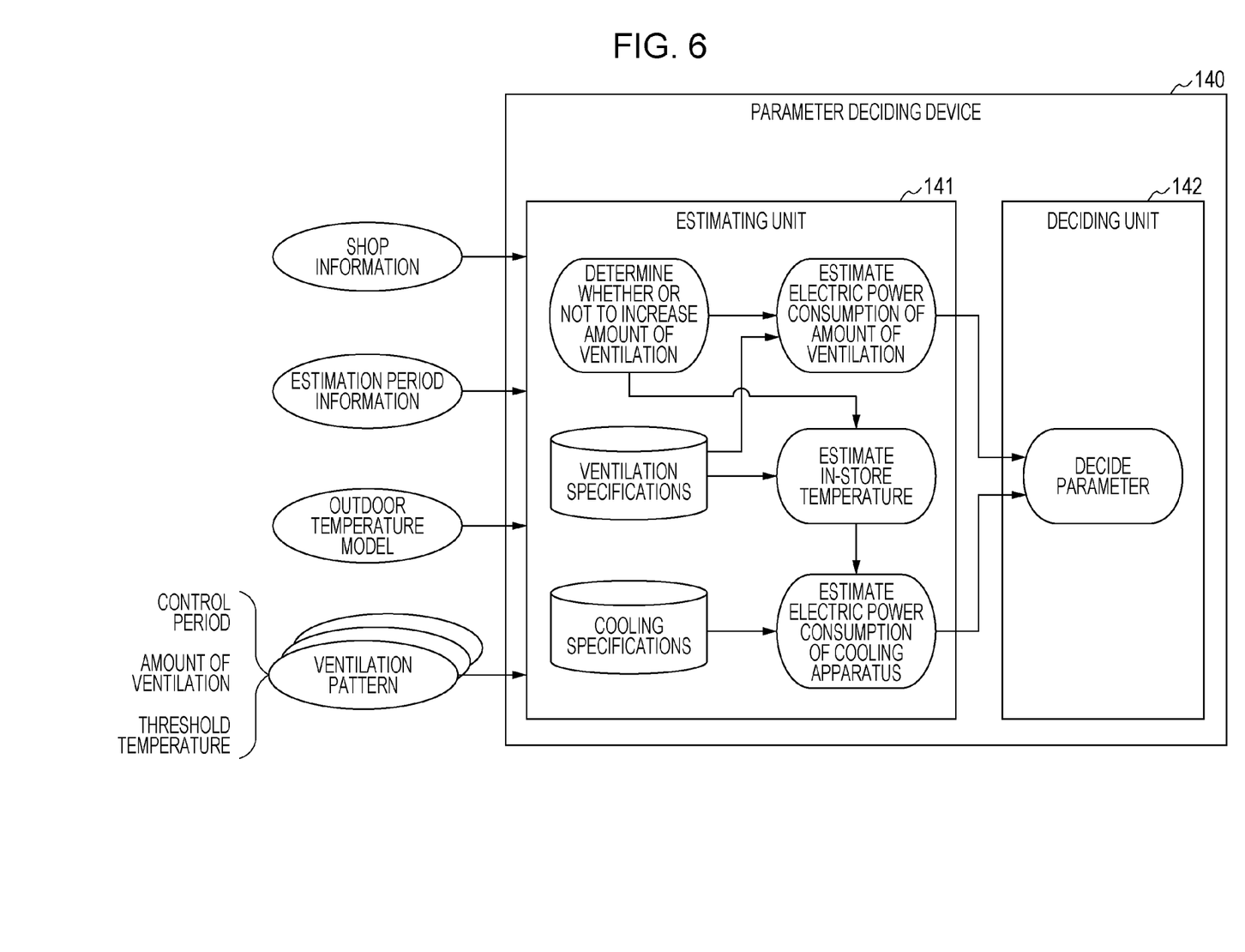
FIG. 6 is a block diagram illustrating a configuration of a parameter deciding device in the specific example.

FIG. 6 is a block diagram illustrating a configuration of the parameter deciding device 140 illustrated in FIG. 5. In this specific example, the parameter deciding device 140 includes an estimating unit 141 and a deciding unit 142.

The estimating unit 141 estimates electric power consumption. The estimating unit 141 may be a general-purpose or a dedicated-purpose electric circuit and may include an arithmetic processor, a storage unit, and the like for estimation of electric power consumption. The arithmetic processor may be an MPU or a CPU. The storage unit may be a volatile memory or a non-volatile memory. A program for estimation of electric power consumption may be stored in the storage unit.

For example, the estimating unit 141 estimates electric power consumption of the ventilation unit 120 and the cooling apparatus 130 including the showcases 136 and 137 in accordance with shop information, estimation period information, an outdoor temperature model, and a ventilation pattern that are externally supplied.

The shop information indicates a target shop for which electric power consumption is estimated. The shop information may be expressed by a shop name, an identifier, or the like for identifying a shop. The shop information may indicate a closed time zone of the shop. The shop information may indicate the ventilation unit 120, the ventilators 121, and the cooling apparatus 130 provided at the shop. Furthermore, the shop information may indicate specifications of the ventilation unit 120, the ventilators 121, and the cooling apparatus 130 provided at the shop.

The shop information may indicate a size of the shop or may indicate a set temperature of the air conditioner 180.

The estimation period information indicates an estimation period that is a target period in which electric power consumption is estimated. The estimation period is, for example, a period from December to February. The estimation period may be 1 day.

The outdoor temperature model is a model indicative of an outdoor temperature. For example, the outdoor temperature model indicates an outdoor temperature per hour and represents, for example, standard transition of an outdoor temperature. The outdoor temperature model may represent standard transition of an outdoor temperature in an estimation period one year ago or may represent standard transition of an outdoor temperature in estimation periods of past ten years. The outdoor temperature model may indicate an outdoor temperature detected by the outdoor temperature sensor 150 in the past. Alternatively, the outdoor temperature model may be given, for example, by a public institution for meteorological observation.

The ventilation pattern is a group of parameters concerning ventilation. Specifically, the ventilation pattern includes, as a group of parameters, a combination of a control period, an amount of ventilation, and a threshold temperature.

The control period included in the ventilation pattern is a period in which an increase in amount of ventilation is controlled. For example, the control period included in the ventilation pattern is expressed by a length of a period from a time at which control of an increase in amount of ventilation starts when the shop closes. Specifically, the control period included in the ventilation pattern may be expressed by a length of a period such as 30 minutes, 1 hour, or 2 hours.

The amount of ventilation included in the ventilation pattern is an increased amount of ventilation. For example, the amount of ventilation included in the ventilation pattern is expressed by the number of ventilators 121 that are additionally put into operation among the one or more ventilators 121 that constitute the ventilation unit 120 when an amount of ventilation is increased. Specifically, the amount of ventilation included in the ventilation pattern may be expressed by the number (e.g., 1, 2, or 3) of ventilators 121. Alternatively, the amount of ventilation included in the ventilation pattern may be expressed by an amount of air that is additionally ventilated or may be expressed by an output level of each of the ventilators 121 that constitute the ventilation unit 120.

The amount of ventilation included in the ventilation pattern may indicate both an amount of ventilation during a usual state and an amount of ventilation during an increased state. For example, the amount of ventilation included in the ventilation pattern may be expressed by the number of ventilators 121 that are put into operation, an amount of ventilated air, or an output level of each of the ventilators 121 both during the usual state and during the increased state. Note that an amount of ventilation during the usual state is basically the same irrespective of the ventilation pattern and therefore may be included in the shop information.

The threshold temperature included in the ventilation pattern is a threshold temperature used for control of an increase in amount of ventilation. For example, the threshold temperature included in the ventilation pattern is expressed by a specific temperature, for example, 1° C., 2° C., or 3° C.

The ventilation pattern may be limited by the shop information. Specifically, the control period included in the ventilation pattern may be limited to the closed time zone indicated by the shop information. Furthermore, the amount of ventilation included in the ventilation pattern may be limited, for example, to the specifications of the ventilation unit 120 and the ventilators 121 indicated by the shop information.

The estimating unit 141 estimates electric power consumption in accordance with the aforementioned information. For example, the estimating unit 141 determines whether or not to increase an amount of ventilation by determining whether or not an outdoor temperature indicated by the outdoor temperature model is equal to or lower than the threshold temperature included in the ventilation pattern in each period included in the estimation period indicated by the estimation period information. Furthermore, the estimating unit 141 may determine whether or not each period included in the estimation period is within the control period included in the ventilation pattern and reflect a result of the determination in determination as to whether or not to increase an amount of ventilation.

The estimating unit 141 estimates electric power consumption of the ventilation unit 120 in accordance with a result of determination as to whether or not to increase an amount of ventilation, specifications of the ventilation unit 120, an amount of ventilation included in the ventilation pattern, and the like. Furthermore, the estimating unit 141 estimates an in-store temperature in accordance with the result of determination as to whether or not to increase an amount of ventilation, specifications of the ventilation unit 120, the amount of ventilation included in the ventilation pattern, the outdoor temperature, and the like.

The size of the shop may be used to estimate an in-store temperature or a set temperature of the air conditioner 180 may be used as an in-store temperature at a time of closing of the shop. That is, the estimating unit 141 may estimate, for each period after closing of the shop, an in-store temperature in accordance with the size of the shop, the set temperature of the air conditioner 180, the result of determination as to whether or not to increase an amount of ventilation, specifications of the ventilation unit 120, the amount of ventilation included in the ventilation pattern, the outdoor temperature, and the like.

Furthermore, an in-store temperature may be estimated by using an outdoor temperature detected by the outdoor temperature sensor 150 in the past, an amount of ventilation controlled by the ventilation system 100 in the past, and an in-store temperature detected by the in-store temperature sensor 160 in the past. That is, the estimating unit 141 may estimate an in-store temperature in accordance with the same environment in the past.

The estimating unit 141 estimates electric power consumption of the cooling apparatus 130 in accordance with the estimated in-store temperature and the specifications of the cooling apparatus 130. The electric power consumption of the cooling apparatus 130 may be estimated by using an in-store temperature detected by the in-store temperature sensor 160 in the past and electric power consumption measured by the measuring unit 170 in the past. That is, the estimating unit 141 may estimate electric power consumption of the cooling apparatus 130 in accordance with the same environment in the past.

For example, the estimating unit 141 may estimate, as electric power consumption of the cooling apparatus 130 at the estimated in-store temperature, electric power consumption that is measured as electric power consumption of the cooling apparatus 130 by the measuring unit 170 when an in-store temperature that matches the estimated in-store temperature is detected in the past by the in-store temperature sensor 160.

Through the above processes, the estimating unit 141 can estimate electric power consumption of the ventilation unit 120 and electric power consumption of the cooling apparatus 130 for each period included in the estimation period and for each ventilation pattern.

The deciding unit 142 decides parameters for control of an increase in amount of ventilation in accordance with the electric power consumption estimated by the estimating unit 141. The deciding unit 142 may be a general-purpose or a dedicated-purpose electric circuit and may include an arithmetic processor, a storage unit, and the like for decision of a parameter. The arithmetic processor may be an MPU or a CPU. The storage unit may be a volatile memory or a non-volatile memory. A program for decision of a parameter may be stored in the storage unit.

For example, the deciding unit 142 acquires a sum of electric power consumption of the ventilation unit 120 and electric power consumption of the cooling apparatus 130 in the estimation period for each of the ventilation patterns. Then, the deciding unit 142 selects a ventilation pattern for which the sum is smallest among the plurality of ventilation patterns and decides, as parameters for controlling an increase in amount of ventilation, a control period, an amount of ventilation, and a threshold temperature included in the selected ventilation pattern.

Although a period from December to February is described as the estimation period, the estimation period may be 1 day. The parameter deciding device 140 may decide parameters by estimating electric power consumption in a normal 1 day or may decide parameters each day by estimating electric power consumption each day.

Figure 7:
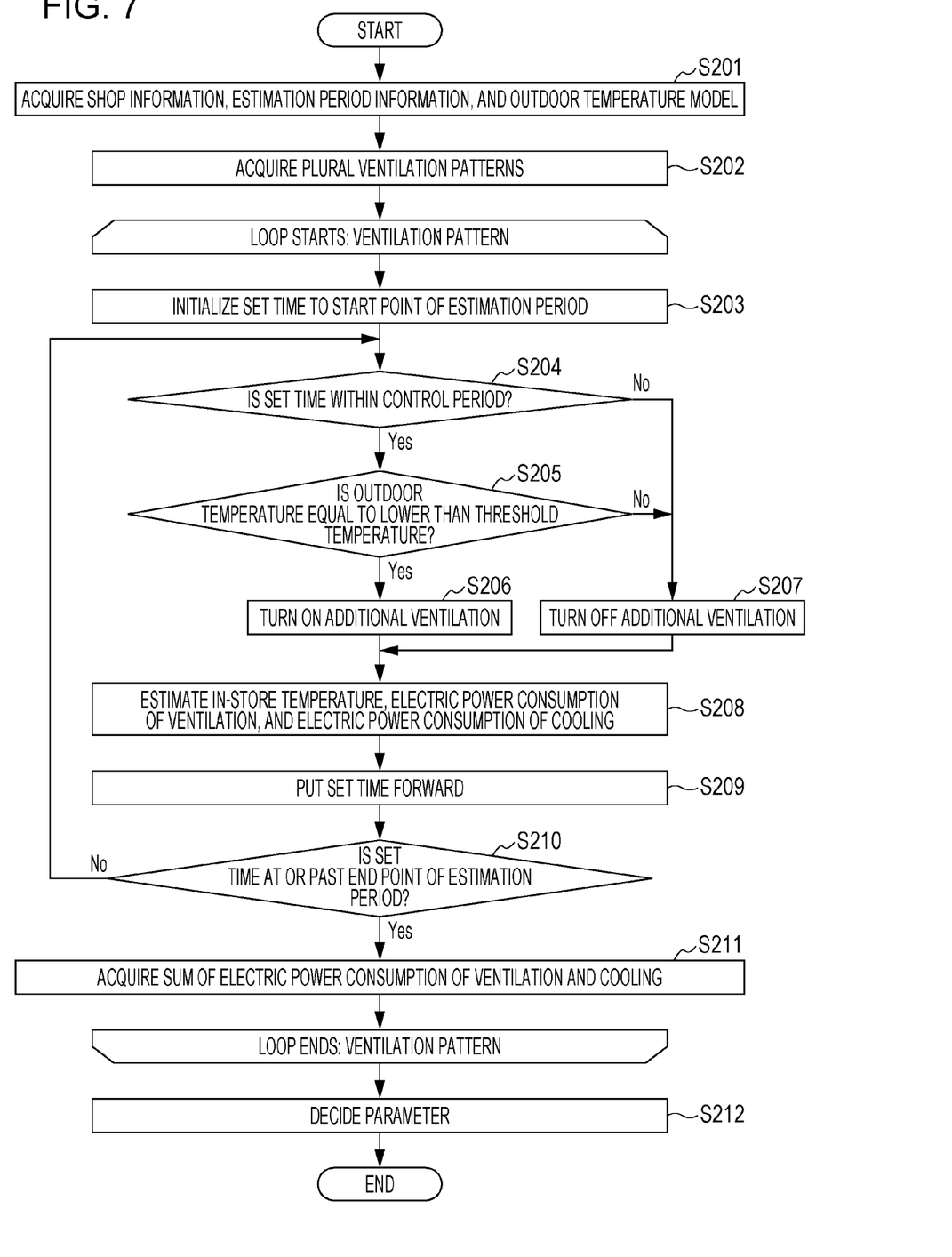
FIG. 7 is a flowchart illustrating an operation of the parameter deciding device in the specific example.

FIG. 7 is a flowchart illustrating an operation of the parameter deciding device 140 illustrated in FIG. 5. The parameter deciding device 140 decides parameters in accordance with the operation illustrated in FIG. 7.

First, the estimating unit 141 of the parameter deciding device 140 acquires shop information, estimation period information, and an outdoor temperature model (S201). Furthermore, the estimating unit 141 acquires a plurality of ventilation patterns (S202).

Next, the estimating unit 141 initializes a set time to a start point of the estimation period indicated by the estimation period information (S203). For example, the set time indicates a target date and time at which electric power consumption is estimated.

When the set time is within the control period included in the ventilation pattern and where an outdoor temperature based on the set time and the outdoor temperature model is equal to or lower than the threshold temperature included in the ventilation pattern (Yes in S204 and Yes in S205), additional ventilation is turned on (S206). That is, the estimating unit 141 runs a simulation so that an amount of ventilation is increased at the set time in accordance with the amount of ventilation included in the ventilation pattern.

When the set time is not within the control period included in the ventilation pattern or the outdoor temperature based on the set time and the outdoor temperature model is higher than the threshold temperature included in the ventilation pattern (No in S204 or No in S205), additional ventilation is turned off (S207). That is, the estimating unit 141 runs a simulation so that an amount of ventilation is not increased at the set time.

Then, the estimating unit 141 estimates an in-store temperature, electric power consumption of the ventilation unit 120, and electric power consumption of the cooling apparatus 130 in accordance with on or off of additional ventilation (S208). Specifically, the estimating unit 141 estimates an in-store temperature and electric power consumption of the ventilation unit 120 in accordance with on or off of additional ventilation. Then, the estimating unit 141 estimates electric power consumption of the cooling apparatus 130 in accordance with the in-store temperature.

Then, the estimating unit 141 puts the set time forward (S209). For example, the estimating unit 141 puts the set time forward by 1 minute. Note that 1 minute is an example of an interval by which the set time is put forward, and the estimating unit 141 may put the set time forward by 10 minutes, may put the set time forward by 30 minutes, or may put the set time forward by 1 hour.

In the previous process (S208), the estimating unit 141 may estimate electric power consumption corresponding to an interval by which the set time is put forward. Although it is supposed that the in-store temperature actually decreases gradually in this time interval, the estimating unit 141 may estimate approximate electric power consumption by regarding that the in-store temperature instantaneously decreases at the start of the time interval. Alternatively, the estimating unit 141 may estimate electric power consumption more accurately by reflecting the gradually decreasing in-store temperature in estimation of electric power consumption.

The estimating unit 141 repeats the processes such as the process for determining whether additional ventilation is turned on or off and the process for estimating electric power consumption until the set time is at the end point of the estimation period or past the end point of the estimation period (S204 to S210). When the set time is at the end point of the estimation period or past the end point of the estimation period (Yes in S210), the deciding unit 142 of the parameter deciding device 140 acquires a sum of the electric power consumption of the ventilation unit 120 and the electric power consumption of the cooling apparatus 130 in the estimation period (S211).

Then, the parameter deciding device 140 performs, for each of the plurality of ventilation patterns, the processes for acquiring a sum of electric power consumption of the ventilation unit 120 and electric power consumption of the cooling apparatus 130 in the estimation period (S203 to S211). Then, the deciding unit 142 of the parameter deciding device 140 selects a ventilation pattern for which the sum of the electric power consumption is smallest and decides, as parameters for controlling an increase in amount of ventilation, a control period, an amount of ventilation, and a threshold temperature included in the selected ventilation pattern (S212).

Since the ventilation system 100 reduces electric power consumption in a closed time zone, the estimating unit 141 of the parameter deciding device 140 may estimate electric power consumption in the closed time zone of the estimation period. Furthermore, since usual ventilation is always on basically, electric power consumption for usual ventilation may be excluded from estimation of electric power consumption.

Figure 8:
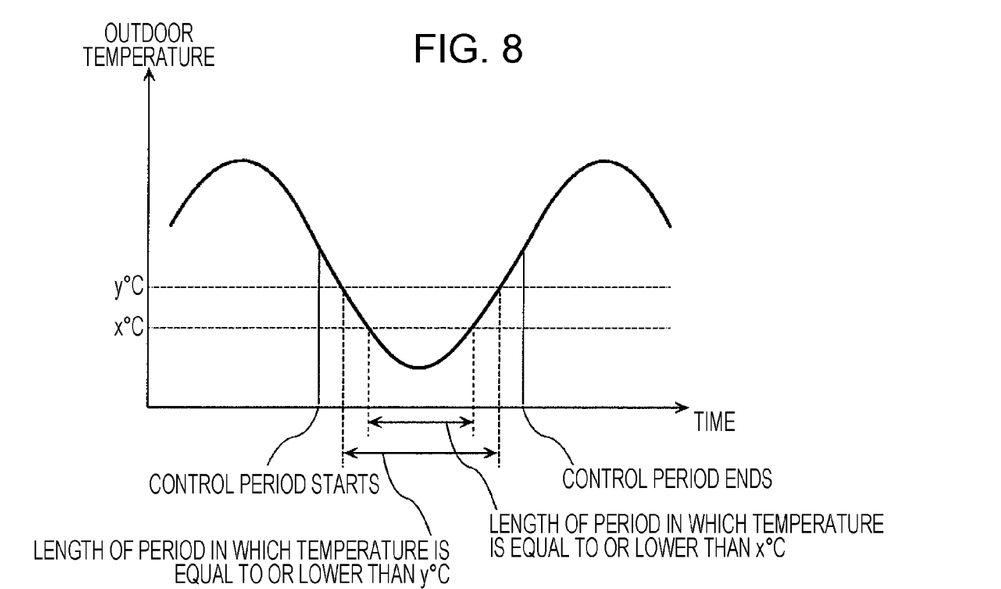
FIG. 8 is a graph illustrating a change in outdoor temperature in the specific example.

FIG. 8 is a graph illustrating a change in outdoor temperature. FIG. 8 illustrates a period in which an amount of ventilation is increased by the ventilation system 100 illustrated in FIG. 5. When the outdoor temperature is equal to or lower than the threshold temperature at a time within the control period, additional ventilation is turned on.

Therefore, it is assumed that when the threshold temperature is high, a period in which the outdoor temperature is equal to or lower than the threshold temperature is long, and a period in which additional ventilation is on is long accordingly. Accordingly, it is assumed that when the threshold temperature is high, electric power consumption of the ventilation unit 120 is large, and electric power consumption of the cooling apparatus 130 is small.

Conversely, it is assumed that when the threshold temperature is low, a period in which the outdoor temperature is equal to or lower than the threshold temperature is short, and a period in which additional ventilation is on is short accordingly. Therefore, it is assumed that when the threshold temperature is low, electric power consumption of the ventilation unit 120 is small, and electric power consumption of the cooling apparatus 130 is large.

Figure 9:
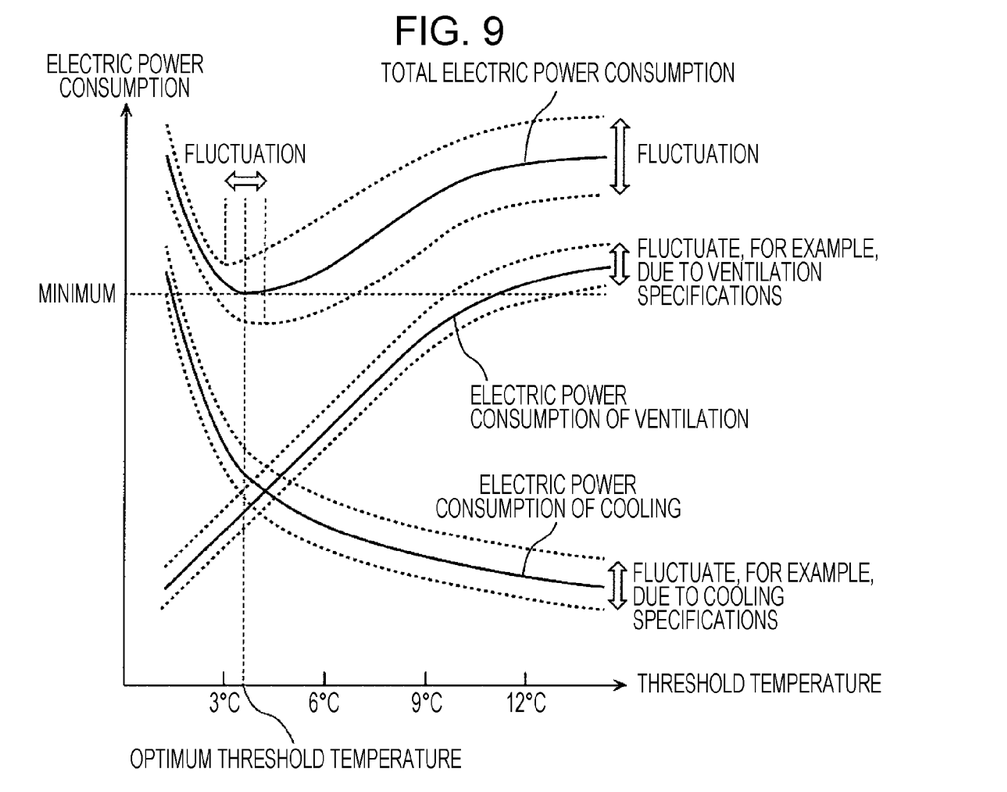
FIG. 9 is a graph illustrating a relationship between a threshold temperature and electric power consumption in the specific example.

FIG. 9 is a graph illustrating a relationship between a threshold temperature and electric power consumption controlled by the ventilation system 100 illustrated in FIG. 5. In FIG. 9, electric power consumption of the ventilation unit 120, electric power consumption of the cooling apparatus 130, and total electric power consumption of the ventilation unit 120 and the cooling apparatus 130 are illustrated for each threshold temperature.

The electric power consumption of the ventilation unit 120 and the electric power consumption of the cooling apparatus 130 fluctuate depending on the threshold temperature. Specifically, when the threshold temperature is low, the electric power consumption of the ventilation unit 120 is small, and when the threshold temperature is high, the electric power consumption of the ventilation unit 120 is large, as described above. Furthermore, when the threshold temperature is low, the electric power consumption of the cooling apparatus 130 is large, and when the threshold temperature is high, the electric power consumption of the cooling apparatus 130 is small.

It is assumed that a threshold temperature at which the total electric power consumption of the ventilation unit 120 and the cooling apparatus 130 is smallest is an optimum threshold temperature. The deciding unit 142 of the parameter deciding device 140 decides, as a parameter for controlling an increase in amount of ventilation, the threshold temperature at which the total electric power consumption of the ventilation unit 120 and the cooling apparatus 130 is smallest.

The electric power consumption of the ventilation unit 120 fluctuates depending on not only the threshold temperature, but also a control period and an amount of ventilation. That is, a curve indicating the electric power consumption of the ventilation unit 120 for each threshold temperature fluctuates also depending on the control period and the amount of ventilation. The electric power consumption of the cooling apparatus 130 fluctuates depending on not only the threshold temperature, but also the control period and the amount of ventilation. That is, a curve indicating the electric power consumption of the cooling apparatus 130 for each threshold temperature fluctuates also depending on the control period and the amount of ventilation.

The deciding unit 142 of the parameter deciding device 140 may decide, as a group of parameters for controlling an increase in amount of ventilation, a combination of a control period, an amount of ventilation, and a threshold temperature for which the total electric power consumption of the ventilation unit 120 and the cooling apparatus 130 is smallest.

Furthermore, the electric power consumption of the ventilation unit 120 also fluctuates depending on specifications of the ventilation unit 120 and the like. Specifically, the electric power consumption of the ventilation unit 120 also fluctuates depending on performance and the like of the ventilators 121 that constitute the ventilation unit 120. That is, a curve indicating the electric power consumption of the ventilation unit 120 also fluctuates depending on the specifications of the ventilation unit 120 and the like.

Furthermore, the electric power consumption of the cooling apparatus 130 also fluctuates depending on specifications of the cooling apparatus 130 and the like. Specifically, the electric power consumption of the cooling apparatus 130 also fluctuates depending on performance and the like of devices that constitute the cooling apparatus 130. That is, a curve indicating the electric power consumption of the cooling apparatus 130 also fluctuates depending on the specifications of the cooling apparatus 130 and the like.

Therefore, a curve indicating total electric power consumption of the ventilation unit 120 and the cooling apparatus 130 fluctuates depending on specifications and the like of at least one of the ventilation unit 120 and the cooling apparatus 130. A threshold temperature at which the sum of the electric power consumption of the ventilation unit 120 and the electric power consumption of the cooling apparatus 130 becomes smallest also fluctuates depending on the specifications and the like of at least one of the ventilation unit 120 and the cooling apparatus 130. Furthermore, the specifications and the like of at least one of the ventilation unit 120 and the cooling apparatus 130 sometimes differ depending on the shop. In view of this, the deciding unit 142 of the parameter deciding device 140 may decide a threshold temperature and the like for each shop.

Figure 10:
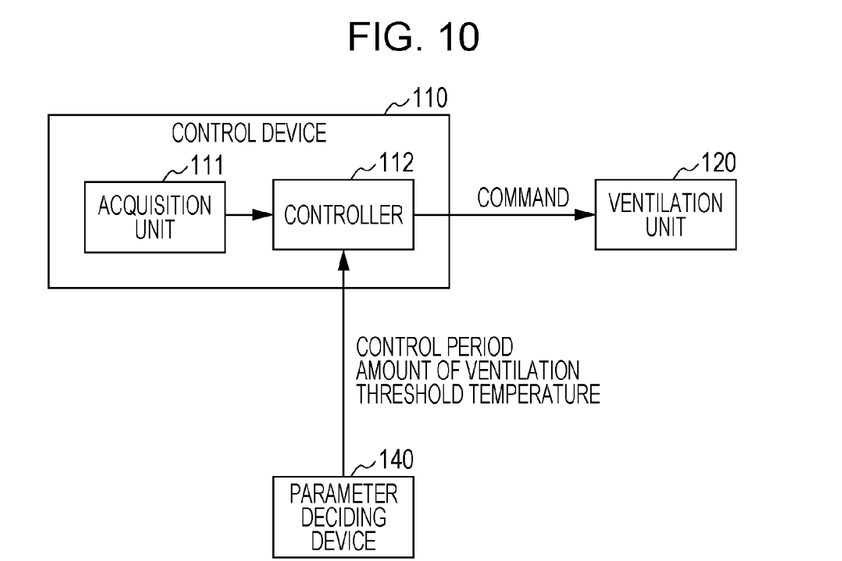
FIG. 10 is a block diagram illustrating a configuration of the control device in the specific example.

FIG. 10 is a block diagram illustrating a configuration of the control device 110 illustrated in FIG. 5. In this specific example, the control device 110 includes the acquisition unit 111 and the controller 112. For example, the acquisition unit 111 acquires an outdoor temperature by receiving the outdoor temperature from the outdoor temperature sensor 150 through wired or wireless communication.

The controller 112 acquires a control period, an amount of ventilation, and a threshold temperature decided by the parameter deciding device 140. The controller 112 may acquire a control period, an amount of ventilation, and a threshold temperature by receiving the control period, the amount of ventilation, and the threshold temperature from the parameter deciding device 140 through wired or wireless communication. The controller 112 may acquire these parameters by receiving these parameters from the parameter deciding device 140 through the acquisition unit 111.

Then, the controller 112 controls an amount of ventilation of the ventilation unit 120 in accordance with the control period, the amount of ventilation, and the threshold temperature decided by the parameter deciding device 140 and the outdoor temperature acquired by the acquisition unit 111. Specifically, the controller 112 increases the amount of ventilation of the ventilation unit 120 in accordance with the decided amount of ventilation when the acquired outdoor temperature is equal to or lower than the decided threshold temperature during the decided control period.

Furthermore, for example, the controller 112 transmits a command to control the amount of ventilation of the ventilation unit 120 to the ventilation unit 120. The ventilation unit 120 receives the command and adjusts the amount of ventilation in accordance with the received command. In this way, the controller 112 controls the amount of ventilation of the ventilation unit 120.

More specifically, when the outdoor temperature is equal to or lower than the threshold temperature during the control period, the controller 112 transmits, to a ventilator 121 that is additionally put into operation in accordance with the decided amount of ventilation among the one or more ventilators 121 of the ventilation unit 120, a command to put the ventilator 121 into operation. In this way, when the outdoor temperature is equal to or lower than the threshold temperature during the control period, the controller 112 increases the amount of ventilation of the ventilation unit 120.

The acquisition unit 111 basically acquires an outdoor temperature at intervals of 1 day or shorter. For example, the acquisition unit 111 acquires an outdoor temperature every 1 minute, 10 minutes, 30 minutes, or 1 hour in accordance with a time interval at which an amount of ventilation is controlled.

Meanwhile, the controller 112 acquires a control period, an amount of ventilation, and a threshold temperature at a time of initial setting of the control device 110. Alternatively, the controller 112 acquires a control period, an amount of ventilation, and a threshold temperature at intervals of 1 day or longer. For example, the controller 112 acquires a control period, an amount of ventilation, and a threshold temperature every 1 year, 1 month, or 1 week.

In other words, a control period, an amount of ventilation, and a threshold temperature are given as parameters to the control device 110 at intervals of 1 day or longer. A timing at which a control period, an amount of ventilation, and a threshold temperature are given as parameters to the control device 110 may be determined in accordance with an estimation period in which electric power consumption is estimated by the parameter deciding device 140. Alternatively, an estimation period in which electric power consumption is estimated by the parameter deciding device 140 may be defined in accordance with a timing at which a control period, an amount of ventilation, and a threshold temperature are given as parameters to the control device 110.

For example, a control period, an amount of ventilation, and a threshold temperature are decided in accordance with an estimation period from December to February and are given to the control device 110 as parameters by the end of November.

Figure 11:
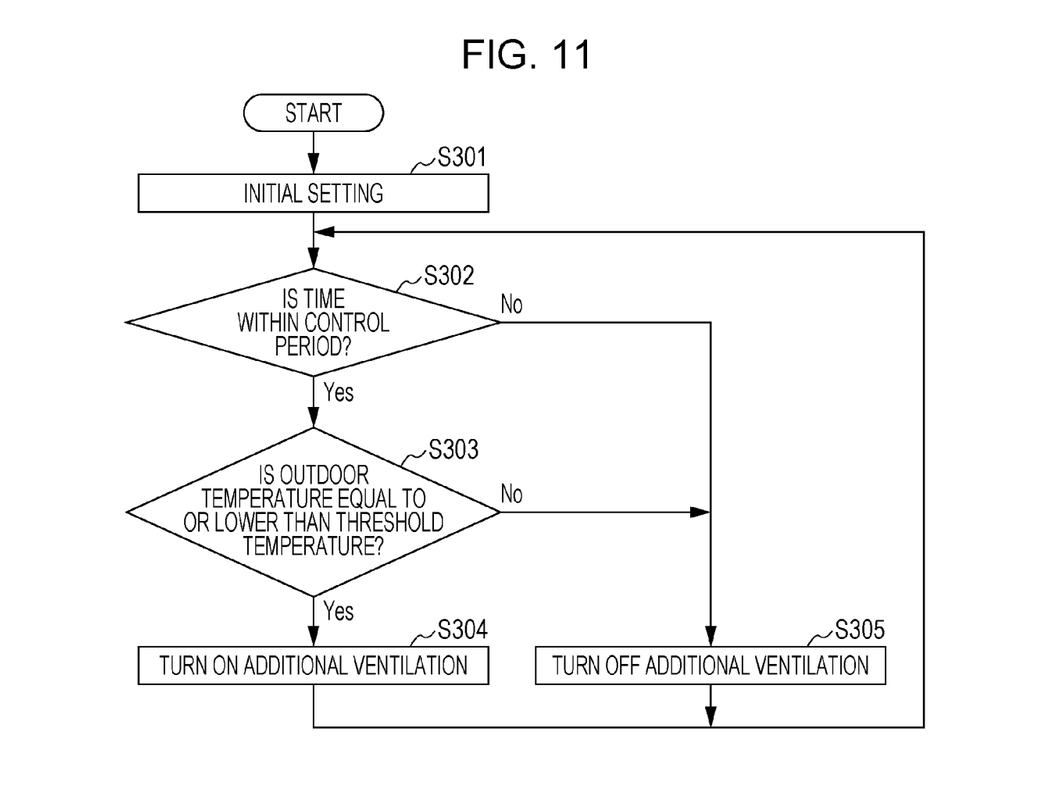
FIG. 11 is a flowchart illustrating an operation of the control device in the specific example.

FIG. 11 is a flowchart illustrating an operation of the control device 110 illustrated in FIG. 5. The control device 110 controls an amount of ventilation of the ventilation unit 120 in accordance with the operation illustrated in FIG. 11.

First, the controller 112 of the control device 110 determines initial setting (S301). For example, the controller 112 acquires parameters such as a control period, an amount of ventilation, and a threshold temperature decided by the parameter deciding device 140. The controller 112 may hold the parameters by causing the acquired parameters to be stored in a memory.

Then, when a current time is within the decided control period and where an outdoor temperature is equal or lower than the decided threshold temperature (Yes in S302 and Yes in S303), the controller 112 turns on additional ventilation (S304). For example, the controller 112 transmits a command to start operation to a ventilator 121 that is additionally put into operation in accordance with the decided amount of ventilation and the like.

Meanwhile, when the current time is not within the decided control period or the outdoor temperature is higher than the decided threshold temperature (No in S302 or No in S303), the controller 112 turns off additional ventilation (S305). For example, the controller 112 does not transmit a command to start operation to the ventilators 121. Alternatively, the controller 112 transmits a command to stop operation to the ventilator 121 that has been additionally put into operation.

The outdoor temperature used for the above determining process (S303) is detected by the outdoor temperature sensor 150 and is acquired by the acquisition unit 111 as needed. The control device 110 repeats the above processes (S302 to S305), for example, every minute. A time interval at which control is repeated by the control device 110 may be identical to a time interval used for estimation of electric power consumption by the parameter deciding device 140. In this way, the control device 110 can properly control an amount of ventilation at a time interval used for estimation of electric power consumption.

Through the above operation, the control device 110 can properly control an amount of ventilation of the ventilation unit 120 in accordance with parameters such as a control period, an amount of ventilation, and a threshold temperature decided by the parameter deciding device 140. Specifically, when the current time is within the decided control period and the outdoor temperature is equal to or lower than the decided threshold temperature, the control device 110 can increase an amount of ventilation of the ventilation unit 120 in accordance with the decided amount of ventilation.

Therefore, the control device 110 can reduce electric power consumption of the cooling apparatus 130 and can keep an increase in electric power consumption of the ventilation unit 120 small.

When an outdoor temperature at a start point of a closed time zone is equal to or lower than the threshold temperature, the control device 110 may increase the amount of ventilation of the ventilation unit 120 throughout the entire control period. When the outdoor temperature at the start point of the closed time zone is higher than the threshold temperature, the control device 110 may make the amount of ventilation of the ventilation unit 120 equal to a usual amount of ventilation throughout the entire control period. Then, the parameter deciding device 140 may estimate electric power consumption in accordance with such an operation and decide parameters. This simplifies the processing.

Figure 12:
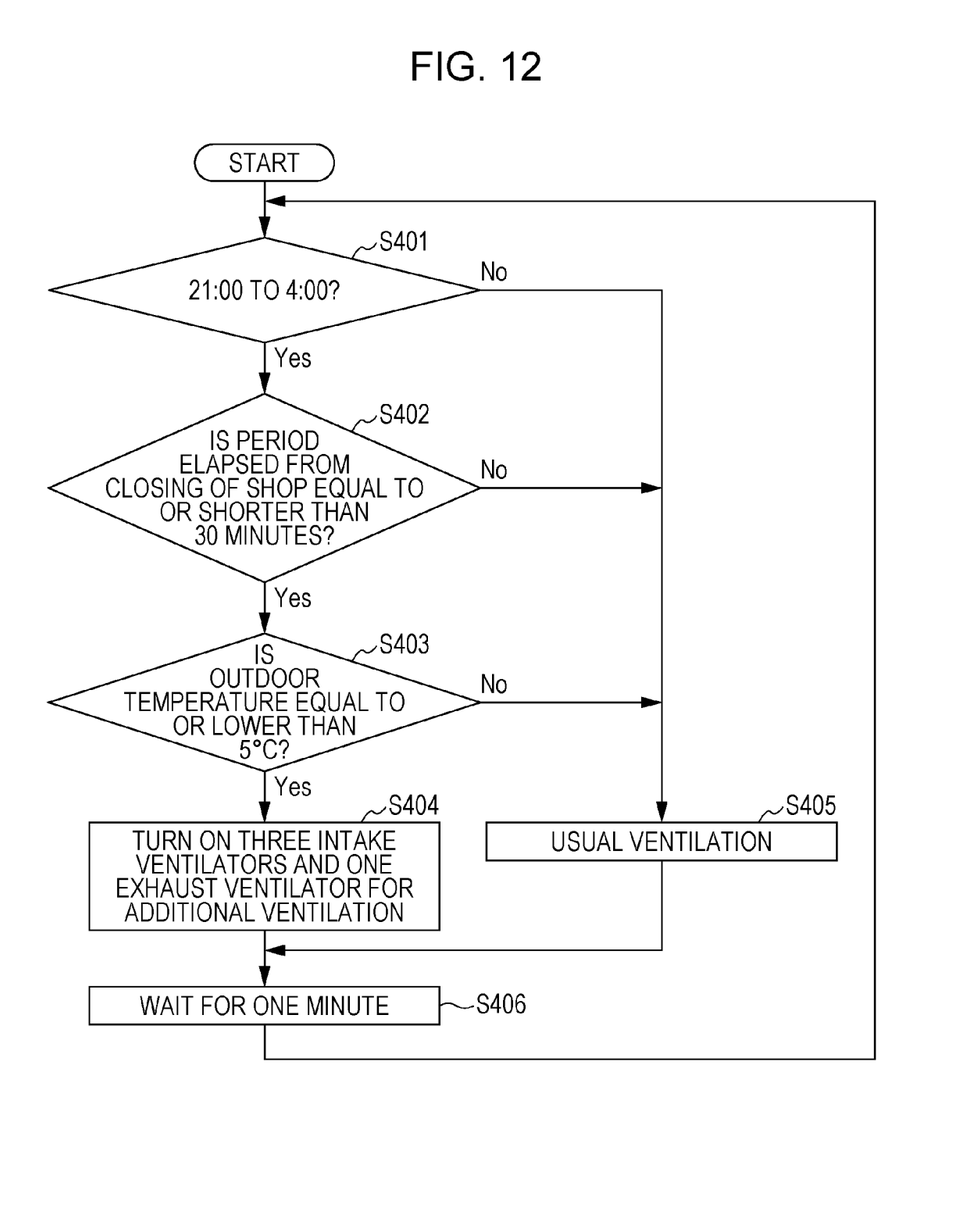
FIG. 12 is a flowchart illustrating an operation performed in accordance with specific parameters by the control device in the specific example.

FIG. 12 is a flowchart illustrating an operation performed in accordance with specific parameters by the control device 110 illustrated in FIG. 5. In this example, the opened time zone is 4:00 to 21:00, and the closed time zone is 21:00 to 4:00. Furthermore, 30 minutes from closing of the shop is preset as a control period. Furthermore, three intake ventilators and a single exhaust ventilator are preset as amounts of ventilation for additional ventilation. Furthermore, 5° C. is preset as a threshold temperature.

In this example, the control device 110 determines whether or not a current time is within the closed time zone from 21:00 to 4:00 (S401). When the current time is within the opened time zone from 4:00 to 21:00 that is not the closed time zone from 21:00 to 4:00 (No in S401), the control device 110 performs usual ventilation (S405). That is, the control device 110 makes the amount of ventilation of the ventilation unit 120 equal to a usual amount of ventilation for 24-hour ventilation.

When the current time is within the closed time zone from 21:00 to 4:00 (Yes in S401), the control device 110 determines whether or nota period elapsed from closing of the shop is within 30 minutes (S402). When the period elapsed from closing of the shop is longer than 30 minutes (No in S402), the control device 110 performs usual ventilation (S405).

When the period elapsed from closing of the shop is within 30 minutes (Yes in S402), the control device 110 determines whether or not the outdoor temperature is equal to or lower than 5° C. (S403). In an environment in which the outdoor temperature is higher than 5° C. (No in S403), the control device 110 performs usual ventilation (S405). In an environment in which the outdoor temperature is equal to or lower than 5° C. (Yes in S403), the control device 110 turns on the three intake ventilators and the single exhaust ventilator for additional ventilation (S404).

That is, the control device 110 turns on the three intake ventilators and the single exhaust ventilator for additional ventilation in an environment in which the period elapsed from closing of the shop is within 30 minutes and the outdoor temperature is equal to or lower than 5° C. When the period elapsed from closing of the shop is longer than 30 minutes or the outdoor temperature is higher than 5° C., the control device 110 turns off the three intake ventilators and the single exhaust ventilator for additional ventilation and causes the ventilation unit 120 to perform ventilation in a usual amount of ventilation.

Then, the control device 110 waits for 1 minute (S406). After waiting for 1 minute, the control device 110 repeats the above processes (S401 to S405).

Through the above operation, the control device 110 can turn on the three intake ventilators and the single exhaust ventilator for additional ventilation in an environment in which the period elapsed from closing of the shop is within 30 minutes and the outdoor temperature is equal to or lower than 5° C. Accordingly, the control device 110 can cool the inside of the store by using cool outdoor air at an early timing after closing of the shop, thereby properly reducing electric power consumption.

Furthermore, the control device 110 does not cool the inside of the store by using cool outdoor air before opening of the store. As a result, the control device 110 can keep an increase in electric power consumption of the air conditioner 180 for heating after opening of the shop small.

As described above, a ventilation system, a control device, and the like according to the present disclosure can properly reduce electric power consumption of a shop in which a cooling apparatus for storage of a product is provided.

In the above embodiment, each of the constituent elements may be realized by dedicated hardware or may be realized by execution of a software program suitable for the constituent element. Each of the constituent elements may be realized by causing a program executer such as a CPU or a processor to read out and execute a software program recorded on a recording medium such as a hard disk or a semiconductor memory. Software realizing the ventilation system according to the above embodiment is the following program.

That is, this program causes a computer to execute a ventilation method for increasing an amount of ventilation of a ventilation unit including one or more ventilators that ventilate a shopping space of a shop in which a cooling apparatus for storage of a product is provided when an outdoor temperature is equal to or lower than a threshold temperature.

In the above embodiment, each of the constituent elements may be a circuit. The plurality of constituent elements may constitute a single circuit or may constitute separate circuits. Each of the circuits may be a general-purpose circuit or may be a dedicated-purpose circuit.

A ventilation system, a control device, and the like according to one or more aspects have been described above, but the present disclosure is not limited to this embodiment. Various modifications of the present embodiment which a person skilled in the art can think of and combinations of constituent elements in different embodiments may be encompassed within a scope of the one or more aspects without departing from the spirit of the present disclosure.

For example, a process executed by a specific constituent element may be executed by another constituent element instead of the specific constituent element in the above embodiment. Furthermore, the order of a plurality of processes may be changed or a plurality of processes may be executed in parallel.

The present disclosure can be used for a ventilation system, a control device, and the like for ventilating a shopping space of a shop in which a cooling apparatus for storage of a product is provided and is applicable, for example, to a building energy management system (BEMS).

What is claimed is:

1. A ventilation method comprising:
    acquiring an outdoor temperature, which is a temperature of air outside a building of a shop in which an air conditioner and a cooling apparatus are provided, wherein the air conditioner adjusts a temperature of air in a shopping space of the shop, and the cooling apparatus cools a product stored in the cooling apparatus;
    determining an electric power consumption by the cooling apparatus;
    determining a threshold temperature based on the determined electric power consumption by the cooling apparatus; and
    increasing an amount of ventilation of one or more ventilators that ventilate the shopping space of the shop in which the cooling apparatus is provided, when the outdoor temperature is equal to or lower than the determined threshold temperature.

2. The ventilation method according to claim 1, wherein the amount of ventilation is increased when the outdoor temperature is equal to or lower than the threshold temperature after the shop closes.

3. The ventilation method according to claim 1, wherein the amount of ventilation is not increased before the shop opens even when the outdoor temperature is equal to or lower than the threshold temperature.

4. The ventilation method according to claim 1, wherein when the shop comprises a plurality of shops, and the threshold temperature set for at least one of the plurality of shops is different from the threshold temperature set for other shops of the plurality of shops.

5. The ventilation method according to claim 1, further comprising:
    determining the amount of ventilation to be increased in the increasing based on the determined electric power consumption by the cooling apparatus.

6. The ventilation method according to claim 1, further comprising:
    determining a control period based on the determined electric power consumption by the cooling apparatus, wherein the control period is a period in which the amount of ventilation of the one or more ventilators is increased when the acquired outdoor temperature is equal to or lower than the determined threshold temperature.

7. The ventilation method according to claim 1, further comprising:
    determining an electric power consumption by the one or more of the ventilators; and
    acquiring a sum of the electric power consumption by the one or more of the ventilators and the electric power consumption by the cooling apparatus,
    wherein, in the determining of the threshold temperature, the threshold temperature is determined such that the acquired sum of the electric power consumption is minimized.

8. A control device comprising:
    a memory that stores instructions; and
    a processor that, when executing the instructions stored in the memory, performs operations including:
    acquiring an outdoor temperature, which is a temperature of air outside a building of a shop in which an air conditioner and a cooling apparatus are provided, wherein the air conditioner adjusts a temperature of air in a shopping space of the shop, and the cooling apparatus cools a product stored in the cooling apparatus;
    determining an electric power consumption by the cooling apparatus;
    determining a threshold temperature based on the determined electric power consumption by the cooling apparatus; and
    increasing an amount of ventilation of one or more ventilators that ventilate the shopping space of the shop in which the cooling apparatus is provided, when the acquired outdoor temperature is equal to or lower than the determined threshold temperature.

9. A ventilation system comprising:
    one or more ventilators that ventilate a shopping space of a shop in which an air conditioner and a cooling apparatus for storage of a product are provided, wherein the air conditioner adjusts a temperature of air in the shopping space of the shop, and the cooling apparatus cools the product stored in the cooling apparatus;
    a memory that stores instructions; and
    a processor that, when executing the instructions stored in the memory, performs operations including:
    acquiring an outdoor temperature, which is a temperature of air outside a building of the shop;
    determining an electric power consumption by the cooling apparatus;
    determining a threshold temperature based on the determined electric power consumption by the cooling apparatus; and
    increasing an amount of ventilation of the one or more ventilators when the acquired outdoor temperature is equal to or lower than the determined threshold temperature.

* * * * *